Jan. 20, 1959 D. F. RADKE ET AL 2,869,790

CARD READER DEVICE

Filed Nov. 16, 1955 3 Sheets-Sheet 1

Inventors
Donald F. Radke,
Karl W. Fagin,
Charles E. Marks,
by Gilbert P. Tarleton
Their Attorney.

Inventors
Donald F. Radke,
Karl W. Fagin,
Charles E. Marks,
by Gilbert P. Tarleton
Their Attorney.

Jan. 20, 1959 D. F. RADKE ET AL 2,869,790

CARD READER DEVICE

Filed Nov. 16, 1955 3 Sheets-Sheet 3

Inventors
Donald F. Radke,
Karl W. Fagin,
Charles E. Marks,
by Gilbert P. Tarleton
Their Attorney.

United States Patent Office 2,869,790

Patented Jan. 20, 1959

2,869,790

CARD READER DEVICE

Donald F. Radke, East Chatham, N. Y., and Karl W. Fagin, Stockbridge, and Charles E. Marks, Pittsfield, Mass., assignors to General Electric Company, a New York corporation Application November 16, 1955, Serial No. 547,063

2 Claims. (Cl. 235—61.11)

The present invention relates to card reader devices. More particularly, the invention is concerned with a mechanical card reader device which electrically actuates and controls the operation of a machine or apparatus in accordance with the information represented by perforations in a record card.

Punched card or sheet reading devices are known in the prior art for controlling various types of machines, but the known reading devices are subject to several disadvantages. Many of the prior card readers are designed to read only one row or column of the record card at a time and require auxiliary equipment to store the information. They often operate to read the information sequentially and for this purpose may embody a mechanism for moving the perforated cards over electrical contacts or brushes, or moving the brushes over the cards, as the reading takes place. Such devices generally require continuity of the source of power to sustain memory. Certain of the prior art devices utilize movable pins or other members moving into and out of the holes in a record card in such a manner that frequently the record cards or sheets become damaged and useless after being processed a few times. Further, the prior art devices generally are quite complicated in construction and operation, are large and cumbersome, and expensive to produce.

It is an object of the present invention to provide a mechanical card reader device which is compact, simple and economical in construction and operation, and reliable in its functions.

It is another object of the invention to provide a mechanical card reader device which is adapted to read all the information at once on the record card, and to store this information for as long a period as desired, and which makes the information available for immediate use and re-use either as a whole or by parts in any desired sequence at any time.

It is still another object of the invention to provide a card reader device of the above type which is adapted to control the operation of machines of various types and functions.

Other objects and advantages will become apparent from the following description and claims.

In its essential aspects, the present invention comprises a device for sensing and transmitting to a receiving apparatus information represented by apertures in a record card or the like, the device including a card carrier which is movable between an inoperative and an operative position, a number of elongated sensing fingers which are compactly arranged side by side, each sensing member having a feeler portion at one end adjacent the card carrier which is adapted during movement of the card carrier from its inoperative toward its operative position to slide along the surface of the card and to drop into an aperture in the card located in its path, the sensing fingers being moved thereafter by the card carrier into operating positions which correspond to the relative position of the apertures in the card into which their feeler portions have dropped, the device comprising, in addition, electrical means associated with the sensing fingers which are adapted to differently actuate the receiving apparatus in accordance with the operating position of the sensing fingers.

The construction of the sensing fingers and the form and arrangement of the electrical contact members which serve to actuate the receiving apparatus are such as to provide a compact device occupying a minimum of space and which nevertheless is adapted to read a considerable amount of information from standard perforated record cards.

In a modification of the card reader device, the arrangement is such that the card carrier may be disengaged from the reading fingers and moved to a position from which the card may be removed while leaving the fingers in their operative position so as to store the information or continue the operation of the receiving apparatus even without the presence of the card.

The invention will be better understood from the following description taken in conjunction with the accompanying drawings, in which.

Figures 1, 2:
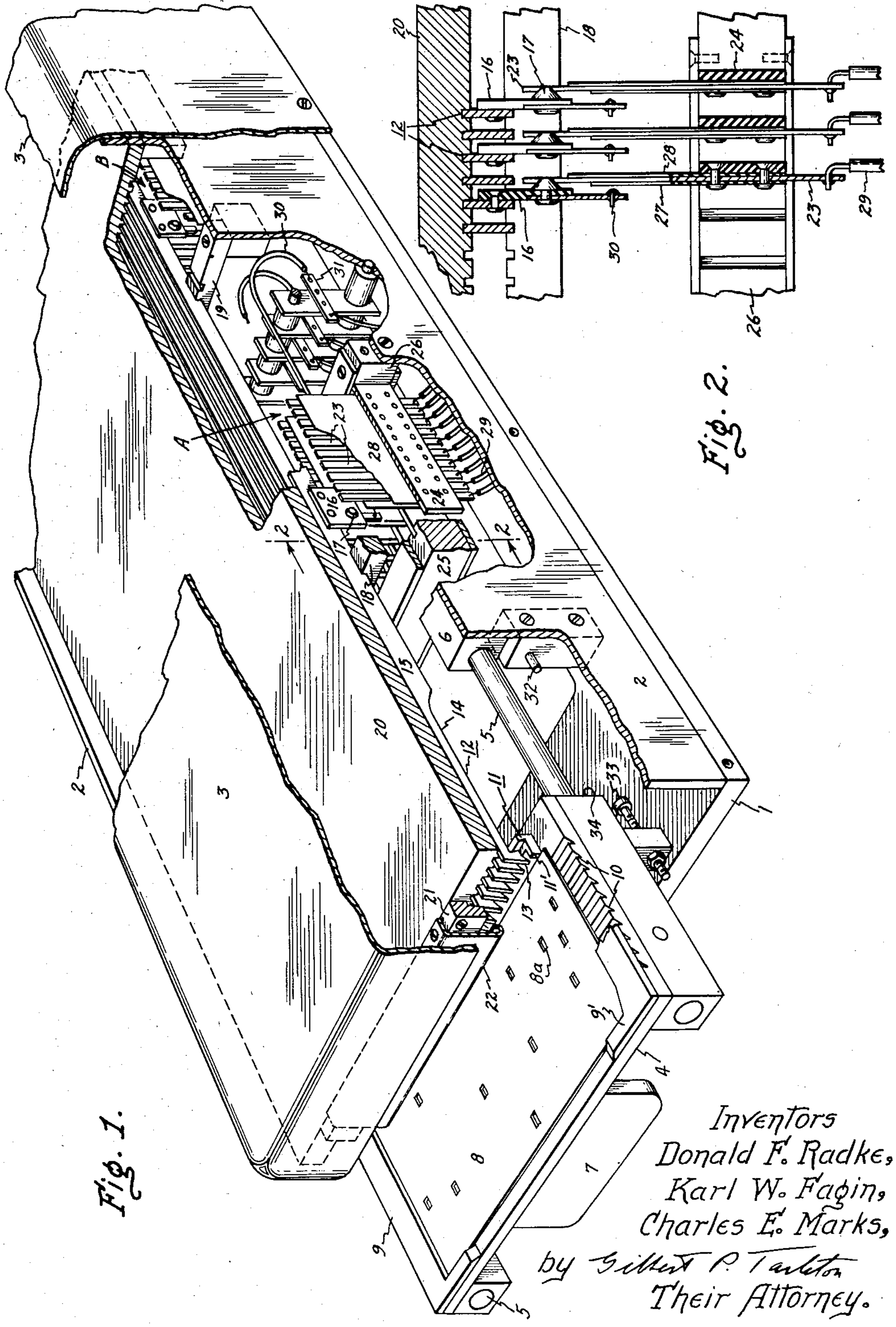
Fig. 1 is a perspective view partly in section of an embodiment of a card reader device constructed in accordance with the invention.
Fig. 2 is a cross-sectional view taken along the line 2—2 of Fig. 1.

Referring now to the drawings, and particularly to Fig. 1, there is shown a card reading device comprising a stationary base 1, a side wall 2 thereon which serves as a supporting frame, and a casing cover 3 overlying the upper portion of the card reader. A card carrier 4 is reciprocably mounted on the supporting frame 2 by means of a pair of rods 5 slidable in supporting blocks 6 secured to frame 2, only one supporting block 6 being shown in Fig. 1. A depending handle 7 is secured to card carrier 4 to enable the latter to be manually moved toward and away from the interior of the casing. The card carrier 4 has an upper surface on which a perforated record card 8 is placed, molding 9—9' being provided to retain the card 8 in the proper position on the surface of carrier 4. The upper surface has a plurality of parallel grooves 10 therein which lie beneath corresponding horizontal rows of apertures on the card 8, the grooves 10 being adapted to register with apertures in record card 8. Each groove 10 is formed with a nearly vertical wall at the front side and a more inclined wall at the rear side, as more clearly shown in Fig. 3. On the rear upper surface of card carrier 4 is fastened a stepped ledge or cam member 11 on which the card sensing fingers 12 are adapted to rest in the inoperative position shown in Fig. 1. Ledge 11 has stop portions 11' (only one being shown in Fig. 1) at opposite ends abutting the upper edge of card 8 to aid in retaining the card in position.

The number of reading fingers 12 corresponds to the number of vertical rows appearing on the record card 8, and typically there are 80 fingers arranged side by side corresponding in position to the 80 columns in a conventional punched record card of known types, although the number of fingers 12 may be more or less than 80, and the card used may be any type having perforations which can be searched by the sensing members of the card reader.

Figures 3, 4, 5:
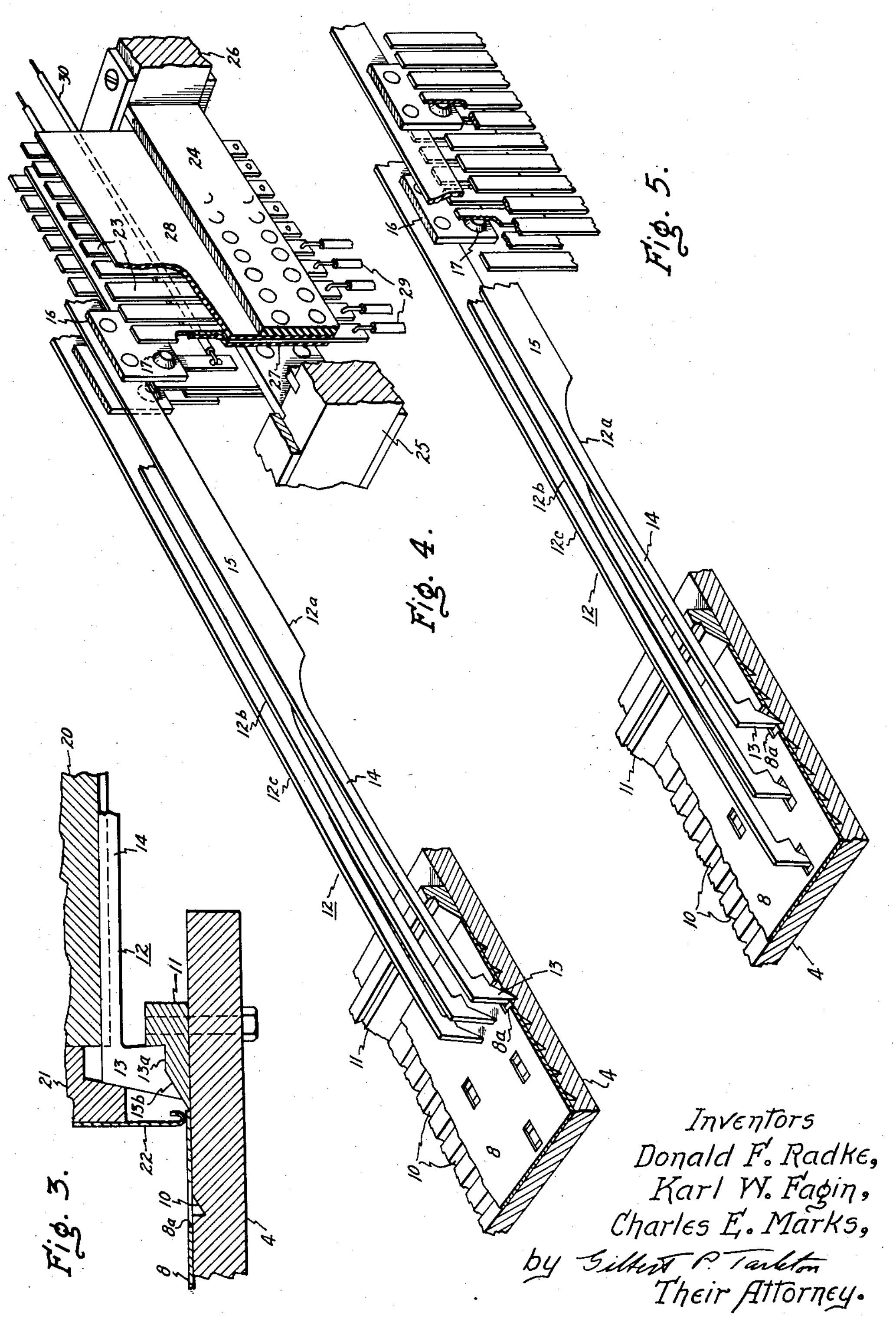
Fig. 3 is a detailed view of a reading finger in its inoperative rest position.
Fig. 4 is a perspective view of a few of the reading fingers showing their relative arrangement after partial movement of the card carrier.
Fig. 5 is a view similar to Fig. 4 showing the position of the reading fingers after the card support has been further moved toward its operative position.

As more clearly shown in Figs. 4 and 5, fingers 12 are in the form of thin strips, e. g., of metal, slightly curved in the longitudinal plane, and arranged closely adjacent one another with their flat sides normal to the plane of the card. Each finger 12 has a feeler portion 13 at its front end adjacent the card carrier, an intermediate attenuated portion 14, and a rear enlarged portion 15 to which an insulating plate 16 bearing an electrical contact button 17 is secured. Fingers 12 are carried by supporting cross-bars 18 and 19 having parallel grooves in which the lower edges of fingers 12 are slidably retained. A top plate 20 suitably supported by frame 2 has corresponding grooves in its bottom surface complementary to the grooves in cross-bars 18 and 19 to similarly receive the upper edges of fingers 12 and guide the fingers as the latter are moved along their lengths. Secured along the forward edge of top plate 20 is an abutment 21 which serves to limit the outward movement of fingers 12 as the card carrier 4 is pulled out to its open inoperative position. Mounted on abutment 21 is an elongated guide member 22 having a lower curved portion which is located adjacent the surface of card 8 and retains it in a flat position as the card moves relative thereto during movement of card carrier 4.

Mounted in the interior of the card reader is a plurality of groups of electrical contact strips 23, one group being associated with each reading finger 12. As will be seen from the figures, the groups of contact strips 23 are in staggered arrangement with alternate groups being in a forward location A and the remainder in a rearward location B, in order to more effectively utilize the available space. As more clearly shown in the cross-sectional view in Fig. 2, the top of the contact strips 23 is below the bottom edge of the fingers 12 so that the latter may pass with clearance over the strips 23. In order to properly engage their associated groups of contact strips 23, the contact bearing plates 16 of fingers 12 are secured on their respective fingers (see Figs. 1 and 2) in an alternately staggered arrangement corresponding to that of the groups of contact strips 23.

The contact strips 23 in each group are held in assembly by an insulating member 24 supported in grooves formed in cross-bars 25, 26, and insulating sheets 27, 28 are arranged on opposite faces of contact strips 23 leaving exposed the opposite end portions thereof as shown in Fig. 2. A conductor lead 29 is connected to the lower end of each contact strip 23, while a conductor lead 30 is electrically connected to the contact button 17 associated with each finger 12. It will be evident, therefore, that as each finger 12 moves longitudinally, its contact button 17 will come into yieldable engagement with each contact strip 23 in turn and thereby make selective electrical contact therewith. Contact strips 23 are preferably so constructed and arranged that they provide high contact pressures and wiping action to attain large current capacity. The number of contact strips 23 in each group will generally be the same as the number of items in each vertical column of the card to be read and in the typical case will be 10, the number of numerical digits for 0–9 inclusive appearing in the columns on the conventional perforated record card.

A set of terminal members 31 is mounted in the interior of the card reader device to which leads 30 are respectively connected and from which conductors lead to a power source driving or actuating the reeciving apparatus controlled by the card reader. Sufficient slack is provided in lead 30 to permit free movement of the finger 12 to which it is connected, at least within the range of width of the record card 8. The individual leads 29 from contact strips 23 are connected to the receiving apparatus in accordance with the type of operation it is desired to obtain when a particular contact 23 is actuated, so that when a contact strip 23 is engaged by the contact button 17 of its associated finger 12, a circuit is closed through the thus engaged contact strip 23 to initiate the operation of the device controlled by that particular contact strip.

Usually, however, it is not intended that the operation of the receiving apparatus be effective until the entire card has been read, and accordingly there is provided a main switch 32 which controls the contact circuits and which remains open until card carrier 4 is pushed inwardly into completely closed operative position, i. e., when the fingers 12 have been permitted to search the entire width of the card. To this end, an adjustable push rod 33 is arranged on card carrier 4 to push in and thereby close main switch 32 when the card has been completely searched by the fingers and it is desired to initiate the operation called for by the information on the card. The distance between the rear face 34 of card carrier 4 and the front face of block 6 is somewhat greater than the spacing between push rod 33 and switch 32, so that the rearward movement of card carrier 4 is halted in its operative position by block 6 shortly after switch 32 is actuated. The range of movement of card carrier 4 between its fully open position as shown in Fig. 1, and its fully closed position with face 34 abutting block 6, is roughly equivalent to the distance between the first and last contact strip 23 in each group, so that it is possible for contact button 17 to cover the entire series of contact strips 23 in each group during movement of reading fingers 12.

The apparatus or machine controlled by the described card reader device can be of any desired type, e. g., electrical, mechanical, electronic or other type, or a plurality of such machines, which are adapted to provide different functions or operations depending on the information extracted from the record card. A typical application for the present device is with an electrically driven machine tool which is set up so that a particular numerical code as represented by perforations in record card 8 corresponds to and effects a series of operations by the machine tool on a work piece. The particular type of operation initiated by the present card reader device or the particular receiving apparatus to which it may be applied does not form a part of the present invention, which is concerned primarily with providing a simple yet efficient mechanical means for extracting the information on perforated record cards and transmitting this information to suitable actuating means, such as electrical circuits, which in turn control the operation of the receiving apparatus.

To aid in understanding the application of the present device, however, without involving complicated electrical and mechanical arrangements which may in practice be used for controlling such receiving apparatus as machine tools, the operation of the device will be described with reference to its use for selectively energizing lamps on a system of light bulbs which could be used, for example, as a signaling or visual communication system.

Figure 6:
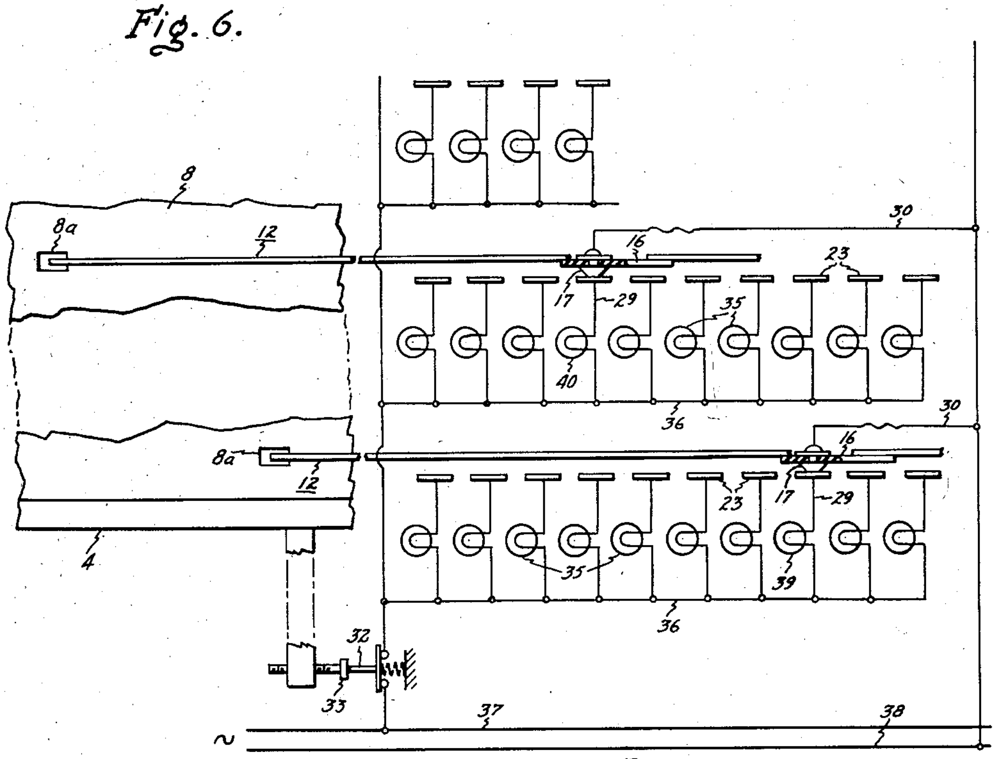
Fig. 6 shows diagrammatically an electrical system which may be actuated by the card reading device.

As diagrammatically shown in Fig. 6, the lamp system includes a group of ten light bulbs 35, associated with each group of contact strips 23, each light bulb 35 being connected to its corresponding contact strip by conductor 29, and the other side of the bulb being connected via a common bus 36 to one terminal of the main switch 32. The other switch terminal is connected to a conductor 37 of a suitable power line. The contact button 17 of each reading finger 12 is connected through conductor lead 30 to the other conductor 38 of the power line. In the condition shown in Fig. 6 with card carrier 4 in fully closed position and main switch 32 closed, it will be seen that circuits are established for illuminating lamps 39 and 40. Although only two such complete circuits are shown, it will be understood that as many other lamp groups and similar circuits are actuated as desired depending on the number of reading fingers 12 provided, and the presence of corresponding apertures in the record card. The particular lamp illuminated in each group will depend of course upon the relative position of the aperture in the record card being read.

In the operation in the device thus far described, card carrier 4 is initially placed in its fully open position as shown in Fig. 1, and a perforated record card 8 is placed in proper position thereon with its upper edge inserted under the rolled edge of rider 22 against stops 11′ and within moldings 9, 9′. In this initial condition, the reading fingers 12 rest with their feeler portions 13 on stepped ledge 11 out of contact with card 8 (see Fig. 3). To begin the procedure of searching the perforations of card 8 by fingers 12, handle 7 is grasped and card carrier 4 is pushed inwardly. Instead of manual operation of the card carrier 4, any other suitable operating means may be provided, such as a pneumatic system, for moving the card carrier. Guide 22 adjacent the surface of card 8 keeps it flat as the carrier 4 is moved inwardly, and at the same time the heel 13*a* of feeler portion 13 slides along the horizontal step of cam ledge 11 keeping the toe 13*b* of feeler 13 spaced high enough to clear the approaching leading edge of card 8. Thereafter heel 13*a*, also referred to herein as a cam follower portion, slides down the inclined portion 11*b* of ledge 11 so that feeler toe 13*b* comes into contact with and slides along the surface of card 8 behind guide 22 as carrier 4 is moved inwardly.

Fig. 4 shows in fragmentary view the relative positions of the parts after card carrier 4 has been pushed a short distance inwardly. Due to the slightly bowed shape of fingers 12, and the slight downward pressure consequently exerted thereon by top plate 20, feeler portions 13 are biased in a downward direction, the attenuated portion 14 being thereby flexed and serving as a spring to resiliently urge feeler portion 13 downwardly and into aperture 8*a* encountered by the feeler as card 8 moves along. In the position shown in Fig. 4, the feeler portion 13 of one of the fingers 12 has dropped through aperture 8*a* and engaged groove 10 immediately below which registers therewith, while the feeler portions of two adjacent fingers remain on the surface of the card. As card carrier 4 is pushed further inwardly, finger 12*a* already engaging groove 10 is pushed backwards while the other two fingers remain in their original position as the card slides beneath them. Eventually upon continued inward pushing of card carrier 4, fingers 12*b* and 12*c* find and drop into apertures in the columns which they are searching, with result that the fingers assume the relative positions shown in Fig. 5.

Assuming that the Fig. 5 position is also the final closed position of card carrier 4, contact button 17 of the respective reading finger 12 are now in electrical contact with the contact strips 23 corresponding to the information items on the card as represented by the perforations therein and the main switch 32 will also be closed. As a result, the selective operation of the receiving system will take place and in the particular simplified application illustrated in Fig. 6, light bulbs in the lamp bank will be energized in accordance with the data read from the card. By way of analogy, where the device is applied to operate a machine tool, the perforated digits in a group of columns of the card may, for example, represent the distance which a work-holding table of the machine tool is to move in order to properly position the work piece relative to the tool. In this case, contact strips 23 which are engaged would set up electrical signals which operate the work-holding table in the intended manner.

When the desired operations have been accomplished by the receiving apparatus or are to be interrupted, card carrier 4 is grasped and pulled outwardly toward its open position, thus opening main switch 32 and interrupting the circuits controlled thereby. As card carrier 4 moves outwardly, fingers 12 retain their displaced positions due to their frictional engagement with contact strips 23 and the retaining grooves in cross-bars 18, 19 and top plate 20. As a result, the toe portions 13*b* of the fingers begin to ride up the inclined walls of their respective grooves 10, move up out of the apertures and slide along the surface of card 8 as it moves outwardly. As card carrier 4 continues its outward movement, feeler portions 13 individually come into engagement with the stepped ledge 11. By virtue of the particular shape of feeler portions 13 and the cam surfaces of ledge 11 as shown, the feelers ride up onto ledge 11 and rest there in inoperative position clear of the card, as shown in Fig. 3. When all of the fingers 12 have reached this position, the engagement of abutment 21 with fingers 12 and the engagement of fingers 12 with the vertical front surface of ledge 11 operate to prevent the further outward movement of card carrier 4. In this position, card 8 may be readily removed, and, if desired, replaced with another card to set up a different operation.

Figure 7:
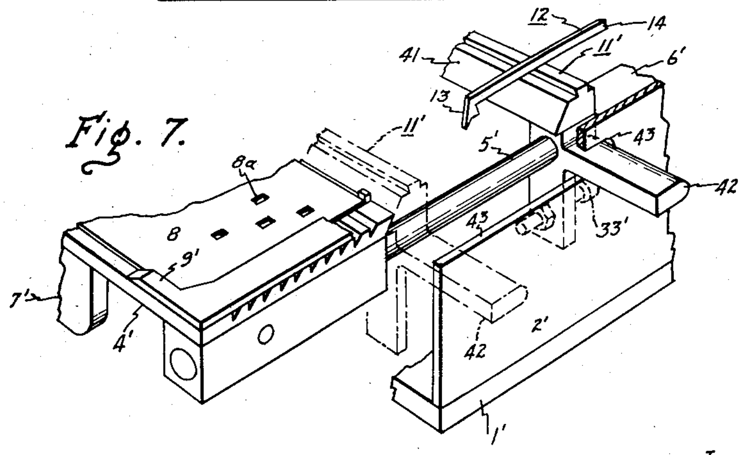
Fig. 7 shows a modification of the card reader device.

Fig. 7 shows a modification of the card reader device wherein the stepped ledge 11′ is made separable from the card carrier 4′ and made independently movable on rods 5′ (only one rod being shown). In this embodiment, the cam surface 41 of stepped ledge 11′ is made somewhat longer than the slope of ledge 11 of the Fig. 1 device, so that the ledge 11′ can properly engage the feeler portions of the fingers which drop somewhat below the plane of the upper surface of card carrier 4′ when the latter is returned to its open position. Stepped ledge 11′ is provided with a handle 42 projecting laterally from the casing through a slot 43 which extends inwardly from the open end of the casing. It will be understood that a similar handle 42 is provided on the opposite side of ledge 11′, both handles normally being used in moving ledge 11′. In this embodiment, the switch actuating push rod 33′ is secured to separable ledge 11′ so as to be movable therewith. By grasping handles 42, the ledge 11′ may be moved freely along rods 5′, and may be brought into a position adjacent card carrier 4′ as shown in dotted lines. Ledge 11′ may, if desired, be moved by other means, such as by a suitably arranged pneumatic operating device.

If it is desired to remove the card after the card carrier has been moved into operative position but it is desired to store the card information in the reading device, the embodiment shown in Fig. 7 may be utilized. In this case, stepped ledge 11′ being freely movable will not operate to push fingers 12 outwardly during outward movement of card carrier 4′, as in the Fig. 1 embodiment. Instead, ledge 11′ will remain free of fingers 12 and the fingers will retain their displaced positions during outward movement of the card carrier 4. The card 8 can thus be removed from the carrier without disturbing the fingers which will continue to store the information appearing on the removed card. Moving card carrier 4′ outwardly away from its closed position in this embodiment will not cause the main switch to be opened, since here push rod 33′ which operates main switch 32 is on the stepped ledge 11′ which remains in position holding the switch closed. When it is desired to return the fingers to inoperative rest position, it is necessary only to move the cam ledge 11′ toward the feeler portions 13 of the fingers by means of handles 42. Ledge 11′ is continued in this movement until all of the fingers 12 ride up on cam surface 41 and attain their original aligned rest position with the stepped ledge 11′ adjacent card carrier 4′ as shown in the dotted position in Fig. 7. When another card is placed in position in carrier 4′ with the parts in the initial inoperative position, it is necessary only to push card carrier 4′ inwardly to thereby push ledge 11′ in the same direction.

The structure thus described provides a static-type, mechanical reading device which is adapted to accurately analyze record cards having a considerable amount of information thereon. By virtue of the novel construction and arrangement of the various parts as described, particularly those of the reading fingers and electric contacts, a card having as many as 80 columns of data can be read at one time with the device, which is nevertheless comparatively small, compact and extremely reliable in operation. The inherent resiliency of the fingers and their biasing as described insures the movement of the fingers into the card apertures while dispensing with auxiliary springs or other members. The provision of grooves in the card carrier as described allows the cards to be repeatedly used by the device without becoming damaged and can therefore be continued to be used without introducing erroneous information. Another advantage of the device is its ability to store as well as to read the information on the punched card without the use of an auxiliary memory device. Moreover, since the information from the card may be set up or stored mechanically by the device, a failure of power does not cause loss of the stored information. The present device also offers advantages over the sequential type of analyzing device in that the information extracted from the card may be transmitted in any order desired without moving the card, such as by suitably interrupting and re-instituting the signals produced by the card reader, and the card and the signals corresponding thereto may be operatively retained for as long or as short a time as necessary.

The card reader described lends itself particularly for use in the field of automation, and is readily applicable for automatic control of a wide variety of machine, such as punch presses, riveting machines, placement machines, milling machines, drills, lathes and the like.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. A device for sensing and transmitting to a receiving apparatus information represented by apertures in a record card or the like comprising, in combination, stationary support means; carrier means having a supporting surface for carrying the apertured card, said carrier means being mounted on said stationary support means for movement between an inoperative and an operative position, a plurality of elongated strip-like sensing members arranged parallel and closely adjacent to each other with flat sides substantially normal to the plane of said supporting surface, said sensing members being mounted on said stationary support means for movement relative thereto between a rest position and an operative position, said sensing members in their rest position being arranged side by side with one end of each member adjacent said carrier means and the other end remote therefrom, each sensing member having a feeler portion at said one end adapted during movement of said carrier means from its inoperative toward its operative position to slide along the surface of the card and to pass through an aperture in the card located in its path, said sensing members being thereafter movable by said carrier means into operative positions corresponding to the relative position of the apertures through which their feeler portions pass; and electrical means associated with said sensing members for differently actuating the receiving apparatus in accordance with the operative positions of said sensing members, said electrical actuating means including contact means movable with each sensing member and a group of stationary strip-shaped contact members arranged with their flat surfaces in a plane parallel to and closely adjacent a respective sensing member, the groups of contacts associated with sensing members which are adjacent each other being displaced from each other along said sensing members, and arranged offset from and substantially in the plane of the adjacent sensing member.

2. In a device for sensing information represented by apertures in a record card or the like, in combination, sensing means comprising at least one elongated member having a feeler portion and a cam follower portion at one end; carrier means movable from an inoperative position toward said end of said elongated member to an operative position and return and having a carrying surface on which the apertured card is adapted to rest with its leading edge spaced from said one end of said elongated member when said carrier means is in inoperative position; and a cam member movable with said carrier means and having a first surface substantially parallel with said carrying surface of said carrier means and co-acting with said cam follower portion of said elongated member for maintaining said feeler portion clear of the leading edge of the card during movement of said carrier means toward said end of said elongated member until said feeler portion passes over said edge, and having a second surface inclined to said first surface toward said carrying surface of said carrier means and co-acting with said cam follower portion for thereafter bringing said feeler portion into contact with the card surface, said feeler portion during continued movement of said carrier means toward its operative position sliding along the card surface until it passes through a card aperture in its path, said cam follower portion upon return movement of said carrier means and said cam member co-acting with said cam member to move said feeler portion clear of the card.

References Cited in the file of this patent

UNITED STATES PATENTS 2,508,603 Gollwitzer ------------- May 23, 1950